(12) United States Patent
Alam

(10) Patent No.: US 8,572,241 B2
(45) Date of Patent: Oct. 29, 2013

(54) INTEGRATING EXTERNAL AND CLUSTER HEAT MAP DATA

(75) Inventor: Salim Alam, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 12/962,869

(22) Filed: Dec. 8, 2010

(65) Prior Publication Data

US 2012/0072578 A1    Mar. 22, 2012

Related U.S. Application Data

(60) Provisional application No. 61/383,931, filed on Sep. 17, 2010.

(51) Int. Cl.
*G06F 15/173* (2006.01)

(52) U.S. Cl.
USPC .......................................... 709/224; 709/229

(58) Field of Classification Search
None
See application file for complete search history.

(56) References Cited

U.S. PATENT DOCUMENTS

| | | | |
|---|---|---|---|
| 7,743,128 B2 | 6/2010 | Mullarkey | |
| 2003/0225876 A1 | 12/2003 | Oliver | |
| 2008/0115103 A1 | 5/2008 | Datars | |
| 2008/0320124 A1 | 12/2008 | Lee et al. | |
| 2012/0042061 A1* | 2/2012 | Ayala et al. | 709/224 |
| 2012/0047265 A1* | 2/2012 | Agarwala et al. | 709/226 |
| 2013/0060933 A1* | 3/2013 | Tung et al. | 709/224 |

* cited by examiner

*Primary Examiner* — Mohamed Ibrahim
(74) *Attorney, Agent, or Firm* — Workman Nydegger

(57) ABSTRACT

The present invention extends to methods, systems, and computer program products for integrating external and cluster heat map data. Embodiments of the invention include a proxy service that manages (e.g., asynchronous) communication with cloud nodes. The proxy service simulates packets to on-premise services to simplify the integration with an existing heat map infrastructure. The proxy maintains a cache of performance counter mappings and timestamps on the on-premise head node to minimize the impact of latency into heat map infrastructure. In addition, data transfer is minimized by mapping a fixed set of resource based performance counters into a variable set of performance counters compatible with the on premise heat map infrastructure.

20 Claims, 2 Drawing Sheets

INTEGRATING EXTERNAL AND CLUSTER HEAT MAP DATA

CROSS-REFERENCE TO RELATED APPLICATIONS

This application claims the benefit of U.S. Provisional Patent Application No. 61/383,931, entitled "Integrating External Heat Map Data With Cluster Heatmap Data", filed Sep. 17, 2010, which is incorporated herein in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premise" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources typically require an account so that the owner of the cloud resource can bill for resource usage. As such, one desiring to use cloud based resource can establish an account for that purpose. Once an account is established, setting up a system within the cloud typically includes configuring two components, a service (computing resources) and data (storage resources).

Some hybrid environments include using on premise resources and cloud resources. Nodes in an on premise cluster often support capability to quickly and visually identify their state through the propagation of performance counters, referred to as a "heat map). However, when cloud nodes are also incorporated it can be difficult to integrate a similar capability. Communication to and within a cloud can be higher-latency, lower-speed, and unreliable relative to an on premise cluster. Since performance counter capabilities are configured for with use cluster nodes (on a faster, low-latency and more reliable network), collection and propagation of performance counters for cloud nodes can be challenging.

BRIEF SUMMARY

The present invention extends to methods, systems, and computer program products for integrating external and cluster heat map data. A cloud based computing service is deployed into a resource cloud. The cloud based computing service supplements an on premise computing service deployed in the on premise cluster.

Deploying the cloud based computing service includes deploying one or more cloud based nodes in a worker role to implement the cloud based computing service. The one or more cloud based nodes are configured to write cloud based performance counters to a cloud based storage location. The cloud based performance counters indicate the state of the one or more cloud based nodes. Deploying the cloud based computing service also includes formulating mappings for mapping the cloud based performance counters into a specified format for use with an on premise heat map service (e.g., an identity of the performance counter instance).

The cloud based storage location is polled for cloud based performance counters subsequent to deploying the cloud based computing service. Cloud based performance counters are received for the one or more cloud based nodes in response to polling the cloud based storage location. The cloud based performance counters are mapped into the specified format in accordance with the formulated mappings. The cloud based performance counters are integrated along with on premise performance counters in an on premise store subsequent to mapping the cloud based performance counters into the specified format. The cloud based performance counters are rendered along with on premise performance counters in a heat map. The heat map indicates indicate the status of the on premise nodes and the one or more cloud based nodes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
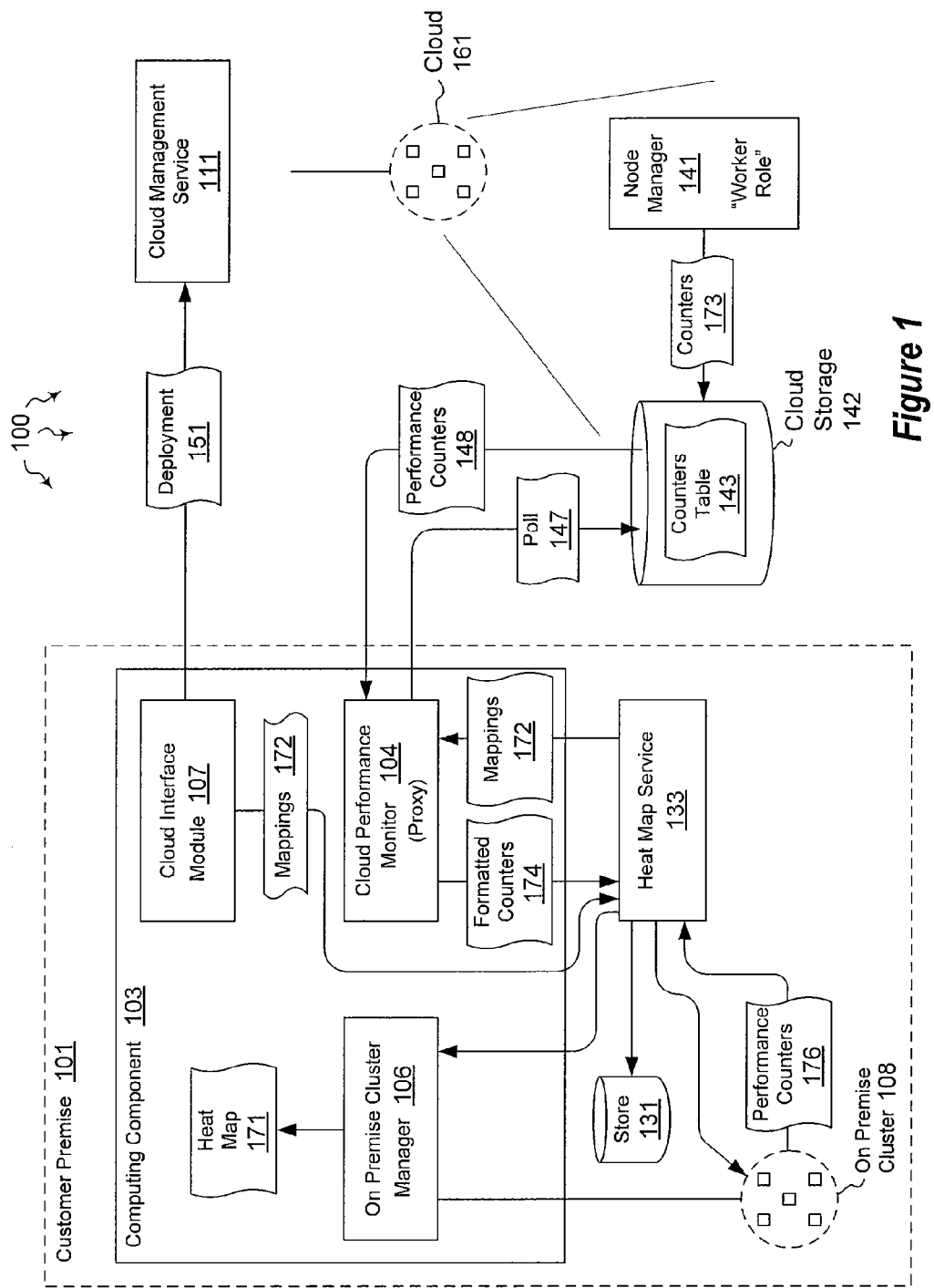
FIG. 1 illustrates an example computer architecture that facilitates integrating external and cluster heat map data.

The present invention extends to methods, systems, and computer program products for integrating external and cluster heat map data. A cloud based computing service is deployed into a resource cloud. The cloud based computing service supplements an on premise computing service deployed in the on premise cluster.

Deploying the cloud based computing service includes deploying one or more cloud based nodes in a worker role to implement the cloud based computing service. The one or more cloud based nodes are configured to write cloud based performance counters to a cloud based storage location. The cloud based performance counters indicate the state of the one or more cloud based nodes. Deploying the cloud based computing service also includes formulating mappings for mapping the cloud based performance counters into a specified format for use with an on premise heat map service (e.g., an identity of the performance counter instance).

The cloud based storage location is polled for cloud based performance counters subsequent to deploying the cloud based computing service. Cloud based performance counters are received for the one or more cloud based nodes in response to polling the cloud based storage location. The cloud based performance counters are mapped into the specified format in accordance with the formulated mappings. The cloud based performance counters are integrated along with on premise performance counters in an on premise store subsequent to mapping the cloud based performance counters into the specified format. The cloud based performance counters are rendered along with on premise performance counters in a heat map. The heat map indicates indicate the status of the on premise nodes and the one or more cloud based nodes.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (Devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention include a proxy service that manages (e.g., asynchronous) communication with cloud nodes. The proxy service simulates packets to on-premise services to simplify the integration with an existing heat map infrastructure. The proxy maintains a cache of performance counter timestamps on the on-premise head node to minimize the impact of latency into heat map infrastructure. In addition, data transfer is minimized by mapping a fixed set of resource based performance counters into a variable set of performance counters compatible with the on premise heat map infrastructure. These mappings are also cached in the proxy in order to minimize the time required to query them from on-premise services.

Accordingly, embodiments of the invention include a proxy service for performance counters, a fixed counter to variable counter mapping, a cache for the fixed counter to variable counter mapping, a cache for keeping the last retrieved time-stamp for each cloud node, and adjustment of tolerances for rendering at different node intervals via use of a "time-to-live" parameter for performance counter data sent to the on-premise heat map service.

Embodiments of the invention use a pull model, with an on-premise cache to hold counter values until the next collection interval. Collection intervals for cloud nodes are variable, and can be orders of magnitude longer than collection intervals for on-premise nodes. Performance counters can be persisted in a fixed format, and those subsequently converted (mapped) to a more dynamic format when written to an on premise store.

FIG. 1 illustrates an example computer architecture 100 that facilitates integrating external heat map data with cluster heat map data. Referring to FIG. 1, computer architecture 100 includes customer premise 101, cloud management service 111, and cloud 161. Customer premise 101 further includes computing component 103, on premise cluster 108, heat map service 133, and store 131. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Computing component 103 further includes cloud performance monitor 104, on premise cluster manager 106, and cloud interface module 107. On premise cluster manager 106 is configured to submit work (e.g., as part of scientific or other computationally intensive operations) for execution using resources in on premise cluster 108. A customer can enter commands through a user-interface, which are forwarded on to on premise cluster manager 106 to configure and control the use of on premise cluster 108. On premise cluster manager 106 is also responsible for rendering a heat map indicate the state of one or more nodes On premise cluster 108 can include a cluster of computer systems configured to interoperate with one another and aggregate (e.g., processor and/or system memory) resources together to solve (e.g., different portions of larger an/or more complex) computations that would potentially overburden a single computer system. The cluster of computer systems can include a plurality of computer systems, such as, for example, 10 s or ever 100 s of computer systems, having computational and storage resources.

In general, heat map service 133 is configured to receive performance counters for one or more nodes. Heat map service 133 can access on premise performance counters from store 131. Heat map service 133 can also access cloud based performance counters from cloud performance monitor 104 through counter store 132.

For time to time, a customer may also desire to use computation and storage resources in cloud 161 to supplement the use of on premise cluster 108. To establish a relationship between customer premise 101 and cloud 161, the customer can register for a subscription with cloud management service 111. In response, cloud management service 111 can return account data to the customer. Cloud management service 111 can also store account data along other credentials in an account database. Credentials can be used to access storage resources for the customer in cloud 161. Account data can include one or more of a subscription ID, a service account name, a storage account name, and a certificate for a customer.

A customer can also provide account data to computing component 103 through the user-interface. Computing component 103 can store the account data. Computing component 103 can use the account data on behalf the customer to facilitate the performance of work in cloud 161.

To facilitate the performance of work, cloud interface module 107 can submit operational data along with appropriate credentials for storage at within cloud 161. Operational data can include data (e.g., queues for accepting units of work, mapping tables to track machines, etc.) for configuring resources of cloud 161 to assist in computations also being worked on by resources in on premise cluster 108.

Cloud interface module 107 can also submit binary code along with credentials for storage within cloud 161. Subsequently, binary code can be executed within cloud 161 to instantiate computing services. Computing services can receive and process units of HPC work to assist resources within on premise cluster 108.

The submission of operational data and binary code is collectively represented as deployment 151. Upon receiving deployment 151, cloud management service 111 performs a number of operations to implement deployment 151, such as, for example, to successfully append cloud resources to a cluster for use by high performance computing component 103.

As part of deployment 151, nodes allocated in cloud 161 can implement a node worker role. A node worker role can call a NodeCounter class during the Run processing of the node to collect performance counters. As part of deployment 151, cloud based storage resources can also be allocated. A table can be maintained within cloud based storage to persist counter information. An on-premise head node can then read the persisted counter information from the cloud based storage.

Upon deployment, worker nodes in cloud 161 can perform work. Node manager 141 can collection performance counters in cloud storage 142. A "worker role's" Run routine can trigger performance counter collection. The routine reads a CollectionInterval role configuration variable to determine the rate (e.g., in seconds) at which counters should be collected. A value of zero means that counters are not to be collected.

A NodeCounter class in the worker role can be called to collect and write out the counters to the counters table 143 in cloud storage 142. The NodeCounter class reads a DataConnectionString role configuration variable for the storage account credentials (for a customer), and a Counters role environment variable for the name of the table to write the counters to. The configuration variables are generated and placed as part of a deployment by cloud performance monitor 104.

A deployment can also include formulating mappings for mapping cloud based performance counters into a specified format compatible with heat map service 133. The deployment creates entries within the heat map service that identify the cloud performance counters in the same format as the on-premise nodes. A CloudPerformanceMonitor class (in cloud performance monitor 104) is responsible for communicating with cloud storage 142. The CloudPerformanceMonitor is responsible for querying the heat map service 133 and caching the mappings for a set of cloud performance counters. For each cloud based deployment, the CloudPerformanceMonitor class periodically polls for cloud based performance counters from cloud storage 142.

Upon receiving cloud based performance counters, cloud performance monitor 104 can map the cloud based performance counters into the specified format in accordance with the formulated mapping. Cloud performance monitor 104 can then forward the cloud based performance monitors to heat map service 133. The on-premise cluster manager can then query the heat map service for the performance counters for on-premise and cloud nodes, and render a heat map. Accordingly, the heat map and downstream management infrastructure can be leveraged mostly unchanged.

Performance counter configuration can be generated at performance monitor 104 and written out as name/value pairs to a cloud role (e.g., .cscfg) file. The following properties may be used by the performance counters:

| Property | Description | Notes |
|---|---|---|
| DataConnectionString | Connection string for the counter storage | Generated from values in the node template |
| Counters | Table name to write counters | Generated from values in the node template |
| CollectionInverval | Interval in seconds to collect counters. Zero means collection is disabled | Generated from a new property added to MonitoringConfiguration (ClusterModel) |

Cloud based performance counter values can be stored in a counters table. The counters table can have the following properties (with sample values):

| NodeName | Counter0Value | ... Counter9Value | TimeStamp | Version |
|---|---|---|---|---|
| CloudCN01 | 9.456 | 3.210 | 7/2/2010 8:11:30 PM | 1 |
| ... | ... | | | |

Each node can have a single entity in the Counters table. When writing new counter values, existing entities can be updated—if none exist a new row can be added. This can reduce the size of the table to a fixed size for a given set of nodes.

A NodeName property identifies the node, and is the logical name that has been assigned to the cloud instance.

A fixed set of counter values for each node—and can be designated Counter0Value, Counter1Value, etc. Counter values can correspond to a well-known, immutable set of predefined counters. As such, counter ids or names do not need to be written out, which saves space in the table.

A TimeStamp property can be used to designate the write time.

A Version property can be set for each entity to identify the set of counters, in case it was to change in the future.

Initial creation of the counters table (e.g., 143) can be done by the node manager 141. Cleanup of the storage can be done by performance interface module 104.

Accordingly, a CloudPerformanceMonitor can be instantiated in computing component 103. The CloudPerformanceMonitor class can be called via a timer that will be invoked at a configurable interval, defined in a Monitoring Configuration, such as, for example:

<SettingDeclaration Name="AzureCollectionInterval"
      Definition="Int">
        <Description>
          <Entry Name="DisplayName"
    ResourceId="MonitoringConfiguration33">Counter Collection Interval for Cloud Nodes (seconds)</Entry>
          <Entry Name="Description"

-continued

ResourceId="MonitoringConfiguration34">The collection interval in seconds for collecting counters from Cloud nodes.</Entry>
        </Description>
    </SettingDeclaration>

Generally, when the CloudPerformanceMonitor is executed, it can check whether it is running on the active head node, and also for the existence of any cloud deployments. When active and deployments are found, it will iterate through the deployments to find the applicable cloud subscriptions and storage accounts.

Figure 2:
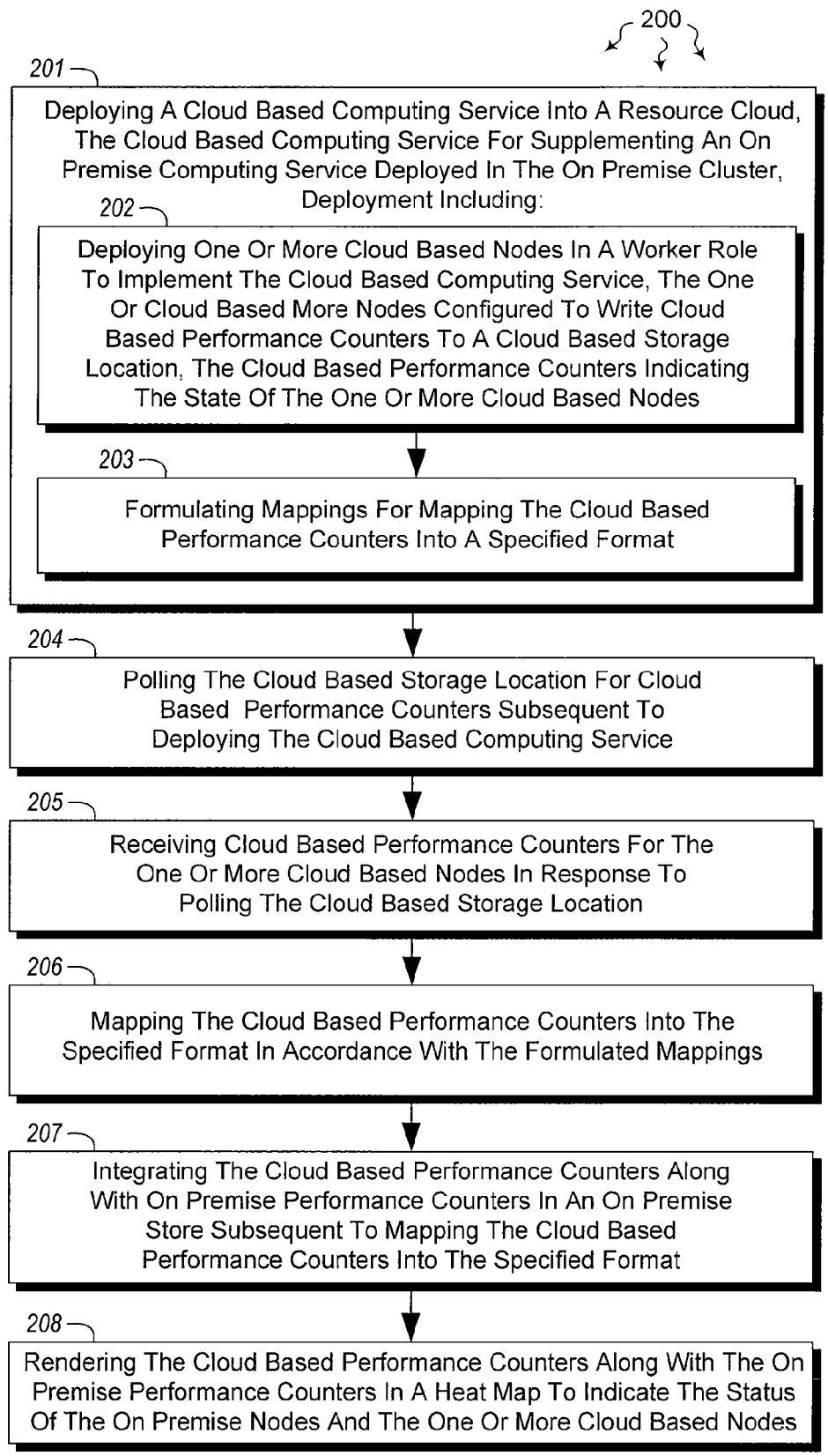
FIG. 2 illustrates a flow chart of an example method for integrating external and cluster heat map data.

FIG. 2 illustrates a flow chart of an example method 200 for using templates to configure cloud resources. Method 200 will be described with respect to the components and data in computer architecture 100.

Method 200 includes an act of deploying a cloud based computing service into the resource cloud, the cloud based computing service for supplementing an on premise computing service deployed in the on premise cluster (act 201). For example, cloud interface module 107 can send deployment 151 to cloud management service 111. Deployment 151 can include operations instructing cloud management service 111 to deploy a service within cloud 161 for use by customer premise 101. The cloud based service can be used to supplement an on premise service deployed in on premise cluster 108.

Deploying a cloud based computing service includes an act of deploying one or more cloud based nodes in a worker role to implement the cloud based computing service, the one or cloud based more nodes configured to write cloud based performance counters to a cloud based storage location, the cloud based performance counters indicating the state of the one or more cloud based nodes (act 202). For example, deployment 151 can include instructions for deploying one or more nodes in cloud 161, including node 141, in a worker role to implement the cloud based computing service. The one or more nodes deployed in cloud 161 are configured to write cloud based performance counters to cluster storage 142. For example, once deployed, node 141 can write counters 173 to cluster storage 142. The performance counters indicate the state of the one or more nodes deployed in cloud 161.

Deploying a cloud based computing service includes an act of formulating mappings for mapping the cloud based performance counters into a specified format (act 203). For example, cloud interface module 107 can formulate mappings 172. Mappings 172 can include the notion of an identifier of a performance counter instance. Mappings 172 can be used to map cloud based performance counters (e.g., in a fixed format) into a specified (e.g., variable) format compatible with heat map service 133.

Method 200 includes an act of polling the cloud based storage location for cloud based performance counters subsequent to deploying the cloud based computing service (act 204). For example, cloud performance monitor 104 can poll cloud storage 142 for cloud based performance counters subsequent to submission of deployment 151.

Method 200 includes an act of receiving cloud based performance counters for the one or more cloud based nodes in response to polling the cloud based storage location (act 205). For example, cloud performance monitor 104 can receive performance counters 148 in response to poll 147. Performance counters 148 can include performance counters from worker nodes deployed in cloud 161, including counters 143 from node 141.

Method 200 includes an act of mapping the cloud based performance counters into the specified format in accordance with the formulated mappings (act 206). For example, cloud performance monitor 104 can map performance counters 148 into formatted performance counters 174 in accordance with mappings 172. Formatted performance counters 174 can be in a format compatible with heat map service 133. Cloud performance monitor 104 can use communication mechanisms to make it appear (simulate) that formatted performance counters 174 are being sent from a node in on premise cluster 108.

At specified intervals (e.g., per second), nodes within on premise cluster 108 can also push performance counters, such as, for example, performance counters 176, to heat map service 133. Cloud performance monitor 104 can also specify a "time-to-live" value when writing out formatted counters to the heat map service 133. The "time-to-live" value allows for a greater tolerance for cloud node performance counters which are refreshed at larger intervals (i.e., less frequently) than the on-premise nodes.

Method 200 includes an act of integrating the cloud based performance counters along with on premise performance counters in an on premise store subsequent to mapping the cloud based performance counters into the specified format (act 207). For example, heat map service 133 can receive formatted counters 174 from cloud performance monitor 104. Heat map service 133 can integrate formatted performance counters 174 with performance counters 176.

Method 200 includes an act of rendering the cloud based performance counters along with the on premise performance counters in a heat map to collectively indicate the status of the on premise nodes and the one or more cloud based nodes (act 208). For example, on-premise cluster manager 106 can render formatted performance counters 174 along with performance counters 176 in heat map 171. Heat map 171 collectively represents the status of nodes in cloud 161 and on premise cluster 108. Heat map 171 can be presented to a customer on a display device and/or through a user interface. Heat map 171 can refresh at defined intervals (e.g., per second).

In some embodiments, the interval for pushing performance counters from on premise nodes and/or the interval for refreshing a heat map differ from the interval for polling cluster storage for cloud based performance counters. For example, the interval for pushing performance counters from nodes in on premise cluster 108 and the interval heat map service 133 refreshes heat maps can be one second. On the other hand, the interval for polling cloud storage 142 can be 20 seconds. As such, a hear map containing cloud based performance counters is updated approximately 20 times between polling.

To compensate, cloud performance monitor 104 can pass in a "time-to-live" value for the cloud based performance counters that specifies the anticipated refresh interval (as well as some additional buffer time) in order to keep the cloud performance counter values current in the heat map service. Thus, when the on premise cluster manager 106 requests performance counter values from the heat map service, it will get the latest cloud performance counter values. Under normal circumstances, the heat map service expires received performance counter values every second.

Tolerances can also be used to mitigate the likelihood of blank space within a heat map. A tolerance can be set at heat map service 133 to reuse a previously received value for some amount of time prior to indicating an error. For example, communication between customer premise 101 and cloud 161 may intermittently go away. Thus, cloud based performance counters may not be received from cloud storage 142 in response to a poll. When cloud based performance counters are not received, buffer values can be exhausted. Heat map service 133 can be continue to use a previously received value for some amount of time (e.g., specified as the "time-to-live" interval) prior to indicating an error for cloud based nodes.

In some embodiments, computing component 103 is a High Performance Computing ("HPC") component (e.g., a head node for on premise cluster 108). As such, work submitted for execution (to on premise cluster 108 and/or to cloud 161) can be part of scientific or other computationally intensive operations. In these embodiments, operational data can be HPC operational data and binary code can be HPC binary code. Based on HPC operational data and HPC binary code, HPC service 137 can run within cloud 161. The HPC service can include queues for accepting units of HPC work, mapping tables to track machines, etc Accordingly, embodiments of the invention extend an existing HPC heat map to compute nodes in the cloud, as well as to other sources of heat map. A buffering scheme can be used to prevent data loss, make efficient use of costly and limited bandwidth, and deliver information to a viewer at a consistent rate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a processor and system memory, the computer system also including a computing component and a heat map service, the computing component having a cloud interface module, a cloud performance monitor, and a heat map module, the computer system within a customer premise and connected to an on premise cluster, a cloud management service and a resource cloud, the heat map service configured to render on premise performance counters in a specified format for on premise nodes running in the on premise cluster, a method for integrating on premise cluster heat map data with resource cloud heat map data, the method comprising:

an act of deploying a cloud based computing service into the resource cloud, the cloud based computing service for supplementing an on premise computing service deployed in the on premise cluster, deployment including:

an act of deploying one or more cloud based nodes in a worker role to implement the cloud based computing service, the one or more cloud based nodes configured to write cloud based performance counters to a cloud based storage location, the cloud based performance counters indicating the state of the one or more cloud based nodes; and an act of formulating mappings for mapping the cloud based performance counters into the specified format;

an act of polling the cloud based storage location for cloud based performance counters subsequent to deploying the cloud based computing service;

an act of receiving cloud based performance counters for the one or more cloud based nodes in response to polling the cloud based storage location;

an act of mapping the cloud based performance counters into the specified format in accordance with the formulated mappings;

an act of integrating the cloud based performance counters along with on premise performance counters in an on premise store subsequent to mapping the cloud based performance counters into the specified format; and an act of rendering the cloud based performance counters along with the on premise performance counters in a heat map to indicate the status of the on premise nodes and the one or more cloud based nodes.

2. The method as recited in claim 1, wherein the act of polling the cloud based storage location comprises an act of polling the cloud based storage location at a polling interval.

3. The method as recited in claim 2, wherein an act of rendering the cloud based performance counters along with the on premise performance counters in a heat map comprises updating the heat map at an update interval, wherein the update interval occurs more frequently than the polling interval.

4. The method as recited in claim 3, further comprising an act of buffering the cloud based performance counters for some amount of time to compensate for update interval occurring more frequently than the polling interval.

5. The method as recited in claim 4, wherein the act of integrating the cloud based performance counters along with on premise performance counters comprises an act of sending the cloud based performance counters from the buffer to the heat map service.

6. The method as recited in claim 1, wherein the act of polling the cloud based storage location comprises an act of a performance monitor class polling the cloud based storage location.

7. The method as recited in claim 1, wherein the act of mapping the cloud based performance counters into the specified format in accordance with the formulated mappings comprises an act of mapping the cloud based performance counters from a fixed format into a variable format.

8. The method as recited in claim 1, wherein the act of integrating the cloud based performance counters along with on premise performance counters comprises an act of sending the cloud based performance counters to the heat map service using communication mechanisms that simulate the cloud based performance counters being sent from an on premise node.

9. A computer program product for use at computer system including a processor and system memory, the computer system also including a computing component and a heat map service, the computing component having a cloud interface module, a cloud performance monitor, and a heat map module, the computer system within a customer premise and connected to an on premise cluster, a cloud management service and a resource cloud, the heat map service configured to render on premise performance counters in a specified format for on premise nodes running in the on premise cluster, the computer program product for implementing a method for integrating on premise cluster heat map data with resource cloud heat map data, the computer program product comprising one or more computer storage devices having stored thereon computer-executable instructions that, when executed at a processor, cause the computer system to implement the method, including the following:

deploy a cloud based computing service into the resource cloud, the cloud based computing service for supplementing an on premise computing service deployed in the on premise cluster, deployment including:

deploying one or more cloud based nodes in a worker role to implement the cloud based computing service, the one or more cloud based nodes configured to write cloud based performance counters to a cloud based storage location, the cloud based performance counters indicating the state of the one or more cloud based nodes; and formulating mappings for mapping the cloud based performance counters into the specified format;

poll the cloud based storage location for cloud based performance counters subsequent to deploying the cloud based computing service;

receive cloud based performance counters for the one or more cloud based nodes in response to polling the cloud based storage location;

map the cloud based performance counters into the specified format in accordance with the formulated mappings;

integrate the cloud based performance counters along with on premise performance counters in an on premise store subsequent to mapping the cloud based performance counters into the specified format; and render the cloud based performance counters along with the on premise performance counters in a heat map to indicate the status of the on premise nodes and the one or more cloud based nodes.

10. The computer program product as recited in claim 9, wherein computer-executable instructions that, when executed, cause the computer system to poll the cloud based storage location comprise computer-executable instructions that, when executed, cause the computer system to poll the cloud based storage location at a polling interval.

11. The computer program product as recited in claim 10, wherein computer-executable instructions that, when executed, cause the computer system to render the cloud based performance counters along with the on premise performance counters in a heat map comprise computer-executable instructions that, when executed, cause the computer system to update the heat map at an update interval, wherein the update interval occurs more frequently than the polling interval.

12. The computer program product as recited in claim 11, further comprising computer-executable instructions that, when executed, cause the computer system to buffer the cloud based performance counters for some amount of time to compensate for update interval occurring more frequently than the polling interval.

13. The computer program product as recited in claim 12, wherein computer-executable instructions that, when executed, cause the computer system to integrate the cloud based performance counters along with on premise performance counters comprise computer-executable instructions that, when executed, cause the computer system to send the cloud based performance counters from the buffer to the heat map service.

14. The computer program product as recited in claim 9, wherein computer-executable instructions that, when executed, cause the computer system to poll the cloud based storage location comprise computer-executable instructions that, when executed, cause a performance monitor class to poll the cloud based storage location.

15. The computer program product as recited in claim 9, wherein computer-executable instructions that, when executed, cause the computer system to map the cloud based performance counters into the specified format in accordance with the formulated mappings comprise computer-executable instructions that, when executed, cause the computer system to map the cloud based performance counters from a fixed format into a variable format.

16. The computer program product as recited in claim 9, wherein computer-executable instructions that, when executed, cause the computer system to integrate the cloud based performance counters along with on premise performance counters comprises computer-executable instructions that, when executed, cause the computer system to send the cloud based performance counters to the heat map service using communication mechanisms that simulate the cloud based performance counters being sent from an on premise node.

17. At computer system including a processor and system memory, the computer system also including a high performance computing component and a heat map service, the high performance computing component having a cloud interface module, a cloud performance monitor, and a heat map module, the computer system within a customer premise and connected to an on premise cluster, a cloud management service and a resource cloud, the heat map service configured to render on premise performance counters in a specified variable format for on premise nodes running in the on premise cluster, a method for integrating on premise cluster heat map data with resource cloud heat map data, the method comprising:

an act of deploying a cloud based computing service into the resource cloud, the cloud based computing service for supplementing an on premise computing service deployed in the on premise cluster to solve a scientific computation, deployment including:

an act of deploying one or more cloud based nodes in a worker role to implement the cloud based computing service, the one or more cloud based nodes configured to write cloud based performance counters to a cloud based storage location, the cloud based performance counters indicating the state of the one or more cloud based nodes; and an act of formulating mappings for mapping the cloud based performance counters into the specified variable format;

an act of a performance monitor class polling the cloud based storage location for cloud based performance counters in accordance with a polling interval subsequent to deploying the cloud based computing service;

an act of receiving cloud based performance counters for the one or more cloud based nodes in response to polling the cloud based storage location, the cloud based performance counters including values for a node name and one or more counter values for each of the one or more cloud based nodes;

an act of mapping the cloud based performance counters into the specified variable format in accordance with the formulated mappings;

an act of the performance monitor class sending the cloud based performance counters to the heat map service using communication mechanisms that simulate the cloud based performance counters being sent form an on premise node;

an act of receiving on premise performance counters pushed from one or more in premise nodes in accordance with a push interval; and an act of rendering a heat map that includes the cloud based performance counters and the on premise performance counters in accordance with an update interval.

18. The method as recited in claim 17, wherein one or more of the push interval and the update interval occur more frequently than the polling interval.

19. The method as recited in claim 18, further comprising an act of buffering the cloud based performance counters in a buffer to compensate for differences in a polling interval and one or more of the push interval and the update interval.

20. The method as recited in claim 19, wherein the an act of the performance monitor class sending the cloud based performance counters to the heat map service comprises act of sending the cloud based performance counters from the buffer to the heat map service.

\* \* \* \* \*